(12) United States Patent  (10) Patent No.: US 8,421,929 B2
Joo et al.  (45) Date of Patent: Apr. 16, 2013

(54) DISPLAY APPARATUS AND POWER SUPPLYING METHOD THEREOF

(75) Inventors: Sung-yong Joo, Yongin-si (KR);
Jin-hyung Lee, Anyang-si (KR);
Won-myung Woo, Seoul (KR);
Yong-joo Lee, Incheon (KR); Sung-bum Jung, Yongin-si (KR); Se-ra Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 12/906,193

(22) Filed: Oct. 18, 2010

(65) Prior Publication Data

US 2011/0096242 A1 Apr. 28, 2011

(30) Foreign Application Priority Data

Oct. 28, 2009 (KR) ........................ 10-2009-0102605

(51) Int. Cl.
*H04N 5/63* (2006.01)
*H02H 7/00* (2006.01)
*H02M 7/04* (2006.01)

(52) U.S. Cl.
USPC ................................ 348/730; 361/18; 362/89

(58) Field of Classification Search .................. 348/730, 348/733; 323/282; 363/45, 46, 50, 89; 361/18, 361/89
See application file for complete search history.

(56) References Cited

U.S. PATENT DOCUMENTS

| 5,600,549 A * | 2/1997 | Cross ............................. 363/46 |
| 6,222,746 B1 * | 4/2001 | Kim ............................... 363/89 |
| 6,956,336 B2 * | 10/2005 | Ribarich ...................... 315/247 |
| 7,276,862 B2 * | 10/2007 | Kim et al. ..................... 315/291 |
| 7,495,875 B2 * | 2/2009 | Lin ................................ 361/89 |
| 8,138,737 B2 * | 3/2012 | Osaka .......................... 323/285 |
| 8,213,135 B2 * | 7/2012 | Kim et al. ..................... 361/18 |
| 2004/0027096 A1 * | 2/2004 | Chen ............................ 323/222 |
| 2005/0269999 A1 * | 12/2005 | Liu et al. ...................... 323/222 |
| 2007/0139984 A1 * | 6/2007 | Lo .................................. 363/89 |
| 2007/0164717 A1 * | 7/2007 | Osaka .......................... 323/282 |
| 2009/0091304 A1 * | 4/2009 | Yang ............................ 323/242 |
| 2009/0168469 A1 * | 7/2009 | Dishman et al. ............... 363/50 |
| 2010/0141035 A1 * | 6/2010 | Chen et al. ..................... 307/64 |

FOREIGN PATENT DOCUMENTS

| KR | 1999-0035769 U | 9/1999 |
| KR | 10-2009-0026624 A | 3/2009 |

\* cited by examiner

*Primary Examiner* — Paulos M Natnael
(74) *Attorney, Agent, or Firm* — Sughrue Mion, PLLC

(57) ABSTRACT

A display apparatus and a power supplying method are provided. The display apparatus includes a signal receiver which receives a video signal; a signal processor which processes the video signal; a display unit which displays an image based on a video signal processed by the signal processor; and a power supply which converts an alternating current (AC) voltage into a direct current (DC) voltage and supplies an operation voltage to the display unit, the power supply including: a power factor correction (PFC) unit which adjusts the DC voltage and corrects a power factor of the power supply; a detector which detects a plurality of voltages in the power supply and outputs a common detection signal indicating whether at least one of the plurality of voltages is abnormal; and a controller which receives the common detection signal, and controls the PFC unit based on the common detection signal.

19 Claims, 6 Drawing Sheets

DISPLAY APPARATUS AND POWER SUPPLYING METHOD THEREOF

CROSS-REFERENCE TO RELATED APPLICATION

This application claims priority from Korean Patent Application No. 10-2009-0102605, filed on Oct. 28, 2009 in the Korean Intellectual Property Office, the disclosure of which is incorporated herein by reference.

BACKGROUND

1. Field

Apparatuses and methods consistent with the exemplary embodiments relate to a display apparatus and a power supplying method thereof, and more particularly, to providing a detection signal about whether a power supply of the display apparatus is abnormal or normal.

2. Description of the Related Art

A display apparatus such as a television (TV) includes a power supply, e.g., a switching mode power supply (SMPS) to supply operation power. The power supply receives commercial alternating current (AC) power and converts it into the operation power having a level required for a target object, thereby supplying the operation power to other elements. Further, the power supply may perform power factor correction (PFC) of the operation power to obtain the maximum active power. The PFC is performed by a PFC circuit, and the PFC circuit boosts a voltage to perform the PFC. In such a power supply, a separate detector is provided for each element in order to determine whether each of the elements constituting the power supply is normal or abnormal. Each detector determines whether a corresponding element is normal or abnormal on the basis of an output voltage of the corresponding element. If an abnormal element is detected, the detector generates an abnormal signal and transmits the abnormal signal to a microcomputer (MICOM), thereby allowing the microcomputer to control whether to operate respective elements. If the number of elements to be detected increases, more corresponding detectors are required and a more expensive microcomputer has to be used since more input terminals of the microcomputer are needed. Thus, the increased number of elements occupies more space of the display apparatus, and causes the cost of the display apparatus to be increased. Further, such problems may arise in not only the display apparatus but also various electronic apparatuses having the foregoing power configurations.

SUMMARY

Accordingly, one or more exemplary embodiments provide a display apparatus and a power supplying method thereof, which can provide a common detection signal about abnormality of elements constituting a power supply to thereby decrease the number of elements for detection and thus reduce the size and cost of the power supply.

The foregoing and/or other aspects may be achieved by providing a display apparatus including: a signal receiver which receives a video signal; a signal processor which processes a video signal received by the signal receiver; a display unit which displays an image based on a video signal processed by the signal processor; and a power supply which converts an alternating current (AC) voltage into a direct current (DC) voltage and supplies an operation voltage to the display unit, the power supply including: a power factor correction (PFC) unit which boosts the DC voltage and corrects a power factor of the power supply; a detector which detects voltages at a plurality of points in the power supply and outputs a common detection signal indicating that at least one of the voltages detected at the plurality of points is abnormal; and a controller which includes a common input terminal to receive the common detection signal output from the detector, and controls operations of the PFC unit in accordance with whether at least one of the voltages at the plurality of points is abnormal or normal, indicated by the common detection signal.

The PFC unit may include a feedback unit to feed the DC voltage back, and the detector may output the common detection signal indicating an abnormality if an output voltage of the feedback unit is higher than a first threshold level.

The power supply may further include a voltage converter to convert a level of the DC voltage and output the operation voltage, and the detector may output the common detection signal indicating an abnormality if the output voltage output from the voltage converter is smaller than a second threshold level.

The operation voltage may include a standby voltage output when the display apparatus is in a standby mode for power saving. The power supply may further include a rectifying unit to rectify the AC voltage, and the detector may output the common detection signal indicating an abnormality if the AC voltage input to the rectifying unit does not have a preset reference waveform.

The display apparatus may further include a semiconductor device to operate so that the common detection signal can have a voltage level indicating an abnormality corresponding to variations of a voltage detected at the plurality of points.

One or more exemplary embodiments provide a power supplying method of a display apparatus provided with a power supply for supplying an operation voltage by converting a level of a direct current (DC) voltage obtained from an alternating current (AC) voltage, the power supplying method including: performing power factor correction (PFC) by boosting a DC voltage; detecting voltages at a plurality of points in the power supply; outputting a common detection signal indicating that at least one of the voltages detected at the plurality of points is abnormal; and controlling the PFC in accordance with whether at least one of the voltages at the plurality of points is abnormal or normal, indicated by the common detection signal.

The outputting the common detection signal may include outputting the common detection signal indicating an abnormality if a feedback voltage fed for the PFC back from the DC voltage is higher than a first threshold voltage.

The outputting the common detection signal may include outputting the common detection signal indicating an abnormality if the operation voltage is lower than a second threshold voltage.

The operation voltage may include a standby voltage output when the display apparatus is in a standby mode for power saving.

The outputting the common detection signal may include outputting the common detection signal indicating an abnormality if the AC voltage input to the rectifying unit does not have a preset reference waveform.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
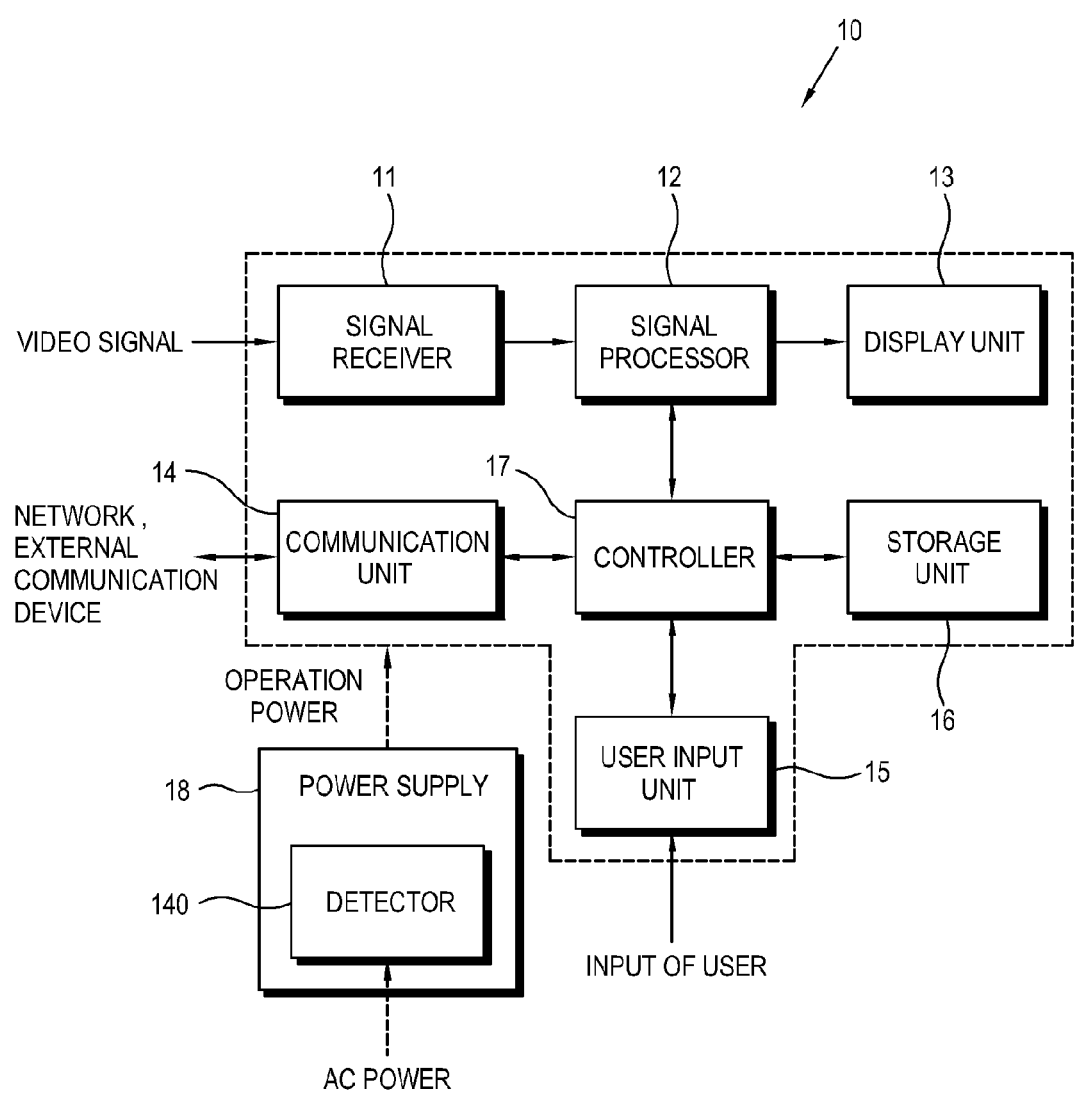
FIG. 1 is a block diagram of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the particular embodiments set forth herein. Descriptions of well-known parts are omitted for clarity, and like reference numerals refer to like elements throughout.

Expressions such as "at least one of," when preceding a list of elements, modifies the entire list of elements and do not modify the individual elements of the list.

FIG. 1 is a block diagram of a display apparatus according to an exemplary embodiment. The display apparatus 10 may be achieved by a TV or the like, which receives and processes a video signal and displays an image based on the video signal. The display apparatus 10 shown in FIG. 1 includes a signal receiver 11, a signal processor 12, a display unit 13, a communication unit 14, a user input unit 15, a storage unit 16 and a controller 17.

The signal receiver 11 receives an external video signal. The video signal received by the signal receiver 11 includes a digital television (DTV) signal, a broadcasting signal such as a cable broadcasting signal, etc. In this case, the signal receiver 11 is tuned to a channel selected by a user and receives a broadcasting signal of the selected channel under control of the controller 17. Also, the video signal received by the signal receiver 11 may include a signal output from a video device such as a digital versatile disc (DVD) player, a Blu-ray disc player, etc. Further, although it is not shown, the signal received by the signal receiver 11 may include an audio signal for outputting sound, a data signal for outputting data, etc. In this exemplary embodiment, the video signal, the audio signal, and the data signal may be received as one signal.

The signal processor 12 performs predetermined signal processing with regard to a video signal received by the signal receiver 11, thereby displaying an image on the display unit 13. The video processing performed by the signal processor 12 includes decoding, image enhancing, scaling, etc. Also, the signal processor 12 may perform processing with regard to the video signal and the data signal received through the signal receiver 11.

The display unit 13 displays an image based on the video signal processed by the signal processor 12. The display unit 13 may include a liquid crystal display (LCD) to display an image. In this case, although it is not shown, the display unit 13 may include an LCD panel, a panel driver, a backlight unit, etc. The display unit 13 may display data contained in the data signal processed by the signal processor 12.

Meanwhile, the display apparatus 10 may further include an audio output unit such as a speaker capable of outputting sound based on the audio signal processed by the signal processor 12.

The communication unit 14 communicates with a communication device (not shown) through a network such as Internet or the like. Further, the communication unit 14 may communicate with a communication device (not shown) through a local area communication method such as a Bluetooth. The communication unit 14 communicates under the control of the controller 17, thereby sending information to the other party's communication device or receiving information from the other party's communication device. The information received from the other party's communication device through the communication unit 14 includes at least one of video, audio and data and undergoes a process according to the corresponding information, so that it can be output through the display unit 13 and the like.

The user input unit 15 receives a user's input. For example, the user input unit 15 may be achieved by a remote controller, a control panel, etc. The user input unit 15 may include an input key for selecting power on/off. The user's input received by the user input unit 15 is sent to the controller 17.

The storage unit 16 stores data or information in the display apparatus 10. For example, the storage unit 16 may be achieved by a non-volatile memory such as a flash memory, a hard disk drive, etc.

The controller 17 generally controls elements of the display apparatus 10, and may include firmware as a control program, and a central processing unit (CPU) and a random access memory (RAM) to execute the firmware.

The display apparatus 10 may further include a power supply 18 to supply operation power to the foregoing element such as the display unit 13 or the like. The power supply 18 receives and converts commercial AC power into power having a level required to operate each element such as the display unit 13 or the like, thereby supplying it to the corresponding element. In FIG. 1, detailed supplying paths of the power from the power supply 18 to the display unit 13 and the like elements are omitted for convenience.

The power supply 18 according to an exemplary embodiment includes a detector 140. The detector 140 detects voltages at a plurality of points of the power supply 18 and outputs a common detection signal indicating whether the voltages at the plurality of points are abnormal or normal. Referring to FIGS. 2 to 5, the power supply 18 according to an exemplary embodiment will be described below in more detail.

Figure 2:
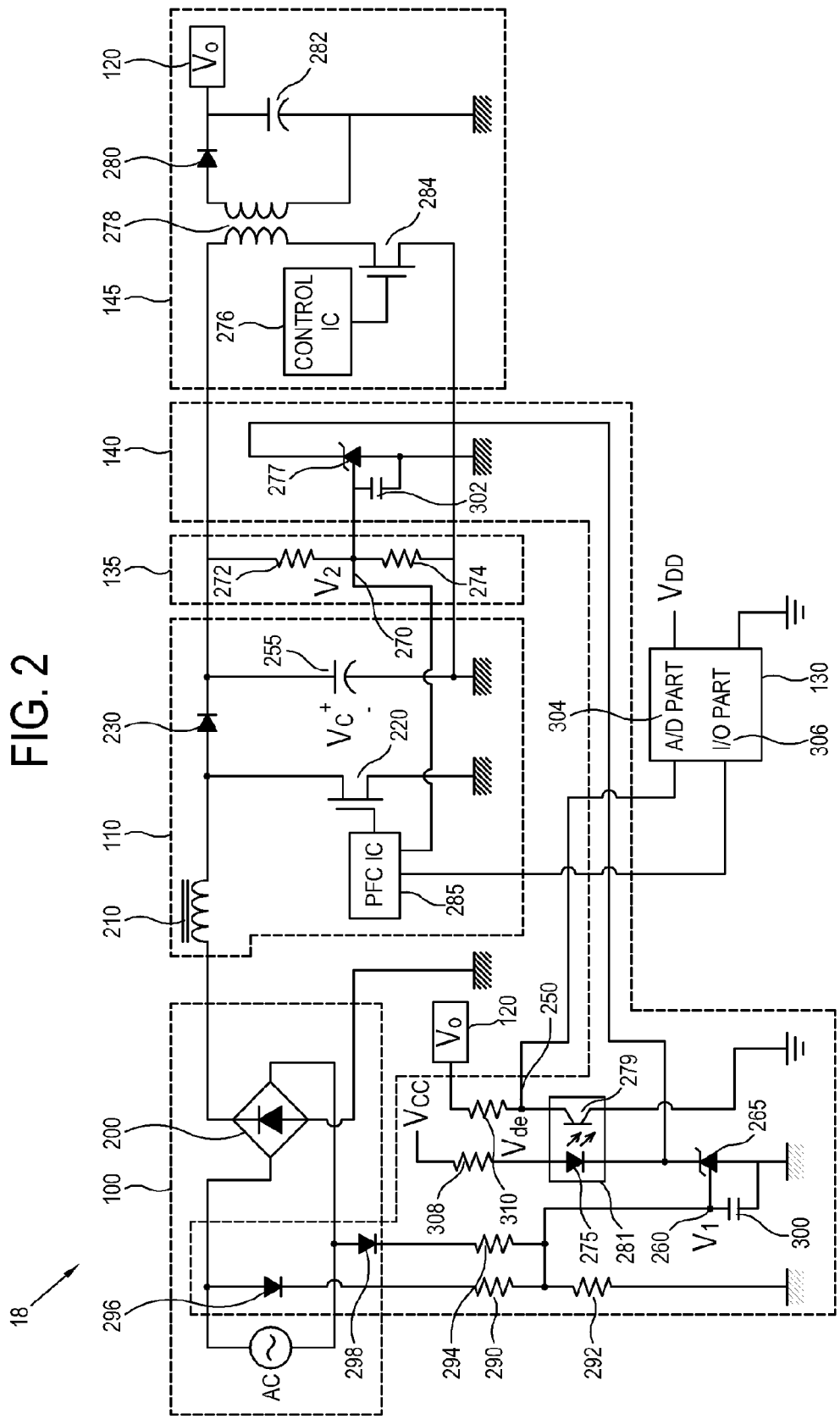
FIG. 2 is a detailed circuit diagram of a power supply of the display apparatus according to an exemplary embodiment.

FIG. 2 is a detailed circuit diagram of a power supply of the display apparatus according to an exemplary embodiment. In this exemplary embodiment, the power supply 18 may further include a rectifying unit 100, a power factor correction (PFC) unit 110, a feedback unit 135, a detection unit 140, a voltage converter 145, and a microcomputer 130.

The rectifying unit 100 rectifies an input AC voltage and thus converts the AC voltage into a direct current (DC) voltage. For example, the rectifying unit 100 may be achieved by a bridge diode 200.

The PFC unit 110 includes a smoothing capacitor 255 to smooth the DC voltage output from the rectifying unit 100. Also, the PFC unit 110 further includes an inductor 210, a first diode 230, a first field effect transistor (FET) 220 and a PFC integrated circuit (IC) 285. The PFC IC 285 turns on/off the first FET 220 in a predetermined duty ratio, and thus boosts a voltage charged in the smoothing capacitor 255, thereby enhancing a power factor of the power supply 18.

In a process of charging the smoothing capacitor 255 with a voltage, if the first FET 220 is turned on, an electric current flows through not a first diode 230 but an inductor 210, so that energy can be accumulated in the inductor 210. Since the energy accumulated in the inductor 210 is not supplied to the smoothing capacitor 255, the voltage charged in the smoothing capacitor 255 is not boosted.

On the other hand, if the first FET 220 is turned off, an electric current flows through the first diode 230 and the energy accumulated in the inductor 210 is supplied to the smoothing capacitor 255, so that the smoothing capacitor 255 can be boosted with energy of the inductor 210. The energy accumulated in the inductor 210 is increased corresponding to an on-time of the first FET 220, and thus the energy stored in the smoothing capacitor 255 is also increased. The PFC IC 285 controls the on-time of the first FET 220 so as to control the energy accumulated in the inductor 210 and the energy stored in the smoothing capacitor 255.

The feedback unit 135 includes a first resistor 272 and a second resistor 274 connected in parallel with the smoothing capacitor 255. The feedback unit 135 outputs a feedback voltage (V2) 270 based on a voltage Vc charged in the smoothing capacitor 255 to the PFC unit 110 in order to operate the PFC unit 110. As shown in FIG. 2, the feedback voltage (V2) 270 is a voltage obtained by dividing the voltage Vc charged in the smoothing capacitor 255 into voltages for the first resistor 272 and the second resistor 274, i.e., a voltage applied to both ends of the second resistor 274.

The PFC unit 110 senses the feedback voltage (V2) 270 output from the feedback unit 135, and estimates a level of the voltage Vc charged in the smoothing capacitor 255. The voltage Vc charged in the smoothing capacitor 255 may be estimated using the resistance values of the first and second resistors 272 and 274. The voltage Vc charged in the smoothing capacitor 255 may be controlled to be within a range from 390V to 400V. If there is no need to boost the voltage Vc of the smoothing capacitor 255, the PFC IC 285 decreases the on-time of the first FET 220 and thus reduces the energy to be accumulated in the inductor 210, thereby preventing the voltage Vc of the smoothing capacitor 255 from being boosted. On the other hand, if the there is a need to charge the smoothing capacitor 255 with a higher voltage, the PFC IC 285 increases the on-time of the first FET 220 and thus accumulates more energy in the inductor 210, thereby boosting the voltage Vc charged in the smoothing capacitor 255.

The voltage converter 145 converts the level of the voltage Vc output from the PFC unit 110, and outputs it as the operation voltage (Vo) 120 to the display unit 13 and the like. As shown in FIG. 2, the voltage converter 145 includes a transformer 278 connected to an output terminal of the PFC unit 110, a second FET 284 connected to a primary-coil side of the transformer 278 in series and intermitting flow of an electric current, a control IC 276 turning on/off the second FET 284, a fourth diode 280 provided in a second-coil side of the transformer 278 and rectifying the output operation voltage Vo 120, and a first capacitor 282 maintaining a level of the operation voltage Vo 120.

The control IC 276 turns on/off the second FET 284 so that the operation voltage Vo 120 can have a predetermined target level. The operation voltage Vo 120 is needed for operated the display unit 13 and the like, and has a voltage level corresponding to the elements to receive the operation voltage Vo 120. For example, the operation voltage Vo 120 supplied to a chip such as the CPU or the microcomputer corresponding to the controller 17 may be about 5V. The voltage controller 145 may need to accommodate multiple values for the operation voltage Vo 120. If there are a plurality of operation voltage Vo 120 values, the voltage converter 145 may additionally include the same or analogous configurations to a second coil for the transformer 278, a fourth diode 280 and a first capacitor 282 corresponding to each operation voltage Vo 120. In this case, the plurality of operation voltage Vo 120 may be different from each other and each have a level for a target element to receive the operation voltage Vo 120.

In this exemplary embodiment, the display apparatus 10 has a normal mode where it normally operates, e.g., displays an image, and a standby mode where it is not in the normal mode and consumes only a minimum amount of power. The PFC unit 110 may not operate in the standby mode but operate in the normal mode.

The detector 140 detects voltages at a plurality of points of the power supply 18, and outputs a common detection signal indicating whether the detected voltages at the plurality of points are abnormal or normal. Referring to FIG. 2, when one among the AC voltage, the output voltage Vc of the PFC unit 110 and an operation voltage (Vo) 120 is abnormal, the common detection signal indicating the abnormality is output. Here, the detector 140 includes first and second shunt regulators 265, 277 and a photo-coupler 281.

The first and second shunt regulators 265, 277 are turned on when an input voltage is higher than a threshold voltage. The photo-coupler 281 includes a light emitter 275 and a light receiver 279. The light emitter 275 emits light when an electric current flows therein, and the light receiver 279 is turned on when a predetermined amount of the emitted light is received.

The microcomputer 130 controls the operation of the power supply 18. In this exemplary embodiment, the microcomputer 130 may include a plurality of input and output terminals. However, the microcomputer 130 uses a common input terminal to receive the common detection signal from the detector 140. If the detector 140 outputs the common detection signal indicating that at least one voltage among voltages at the plurality of points is abnormal, the microcomputer 130 stops the operation of the PFC unit 110.

Figure 3:
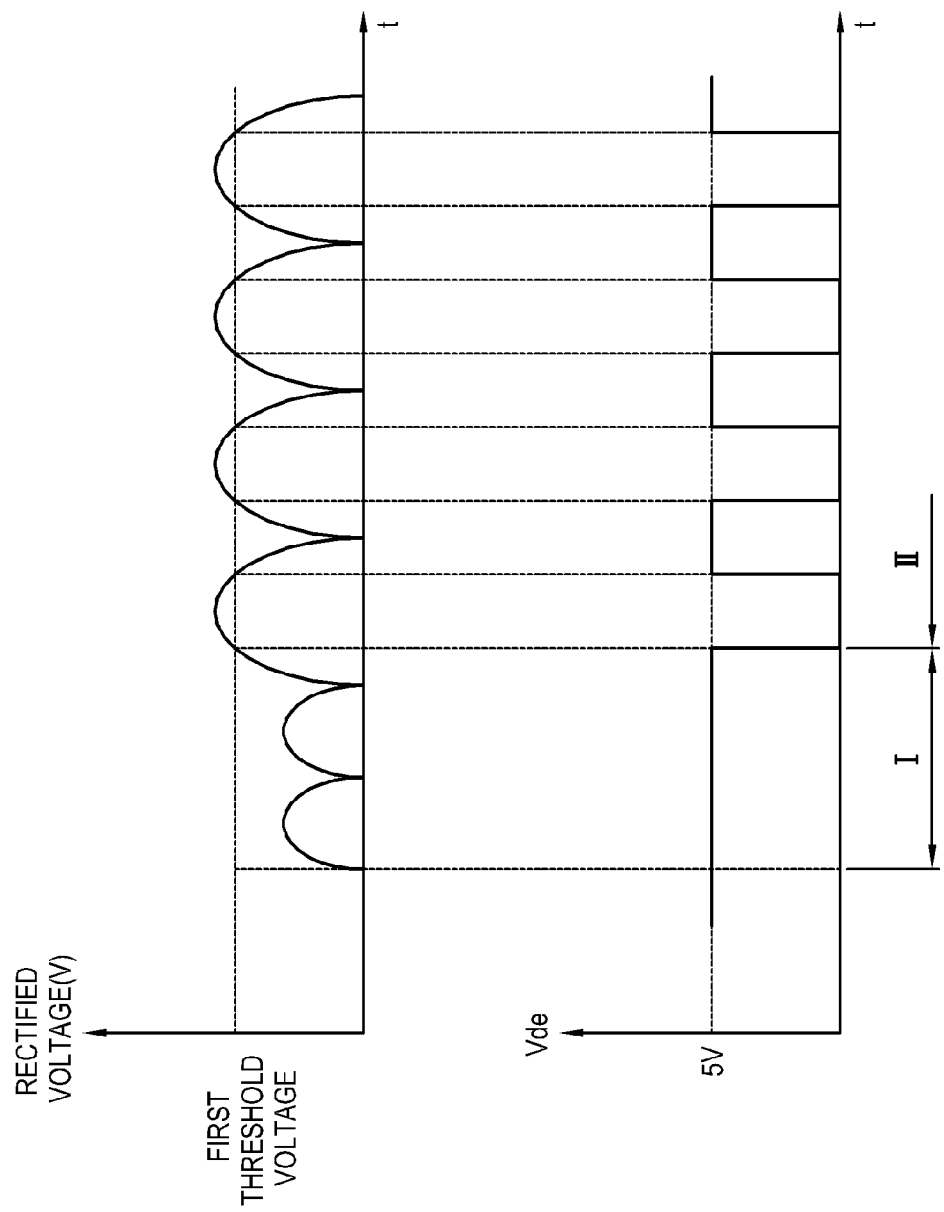
FIG. 3 is a view for explaining an operation of a detector of the power supply that detects whether an AC voltage is abnormal or normal according to an exemplary embodiment.

FIG. 3 is a view for explaining an operation of a detector of the power supply that detects whether an AC voltage is abnormal or normal according to an exemplary embodiment.

In this exemplary embodiment, a rated input voltage for the power supply 18 is set up. That is, if an AC voltage of about 120V or 230V is input, the power supply 18 can operate normally. If the rated input voltage is input, the rectifying unit 100 converts the AC voltage into the DC voltage.

Meanwhile, an AC voltage input terminal of the detector 140 has a first end to which a second diode 296 and a third resistor 290 are connected, and a second end to which a third diode 298 and a fourth resistor 294 are connected. Also, a fifth resistor 292 has a first end connected to a node between the third resistor 290 and the fourth resistor 294, and a second end connected to the ground.

When receiving the AC voltage, a voltage (V1) 260 is generated and applied to both ends of the fifth resistor 292, and used as an input voltage of the first shut regulator 265. The second capacitor 300 maintains the level of the voltage (V1) 260, and the threshold voltage of the first shunt regulator 265 is previously set up in consideration of the rated AC voltage.

If the input AC voltage drops below the rated AC voltage, the voltage (V1) 260 is lower than the threshold voltage of the first shunt regulator 265 and thus the first shunt regulator 265 is turned off, so that there is no flow of an electric current. Accordingly, the light emitter 275 connected in series to the first shunt regulator 265 emits no light since an electric current does not flow therein. The light receiver 279 is turned off because there is no light received from the light emitter 275. A voltage (Vde) 250 is connected in series through a seventh resistor 310 to the operation voltage Vo 120, so that the detector 140 outputs the same voltage as the operation voltage Vo 120. Here, the operation voltage Vo 120 is 5V, which is the same as the operation voltage output from the voltage converter 145.

Since the voltage (Vde) 250 becomes 5V, a high signal is input to the input terminal (A/D port) 304 of the microcomputer 130 (I). If the high signal is continuously input, the microcomputer 130 determines that an abnormality has occurred, and sends an off signal to the PFC IC 285 through the output terminal (I/O port) 306 in order to prevent the PFC unit 110 from operating.

In the case that the rated AC voltage is input, if the voltage (V1) 260 is lower than the threshold voltage of the first shunt regulator 265, the foregoing operation is performed. On the other hand, if the voltage (V1) 260 is higher than the threshold voltage, the first shunt regulator 265 is turned on and allows an electric current to flow. Because the light emitter 275 has a first end connected to a voltage Vcc and a sixth resistor 308, and a second end connected to the ground, the light emitter 275 allows the electric current to flow and emits light. If the light emitter 275 emits light, the light receiver 279 receives the light and thus the electric current flows through the light receiver 279. The voltage (Vde) 250 is connected to the ground, and therefore a low signal is input to the input terminal 304 of the microcomputer 130. Through these operations, a pulse signal alternating between a high signal and a low signal is supplied to the input terminal (A/D port) 304 of the microcomputer 130. That is, as shown for example in FIG. 3, when the input AC voltage has a preset waveform, the pulse signal is supplied to the microcomputer 130. When receiving the pulse signal for a predetermined time (II), the microcomputer 130 determines that the rated AC voltage is input, and supplies an on signal to the PFC IC 285 through the output terminal (I/O port) 306, thereby operating the PFC unit 110.

Figure 4:
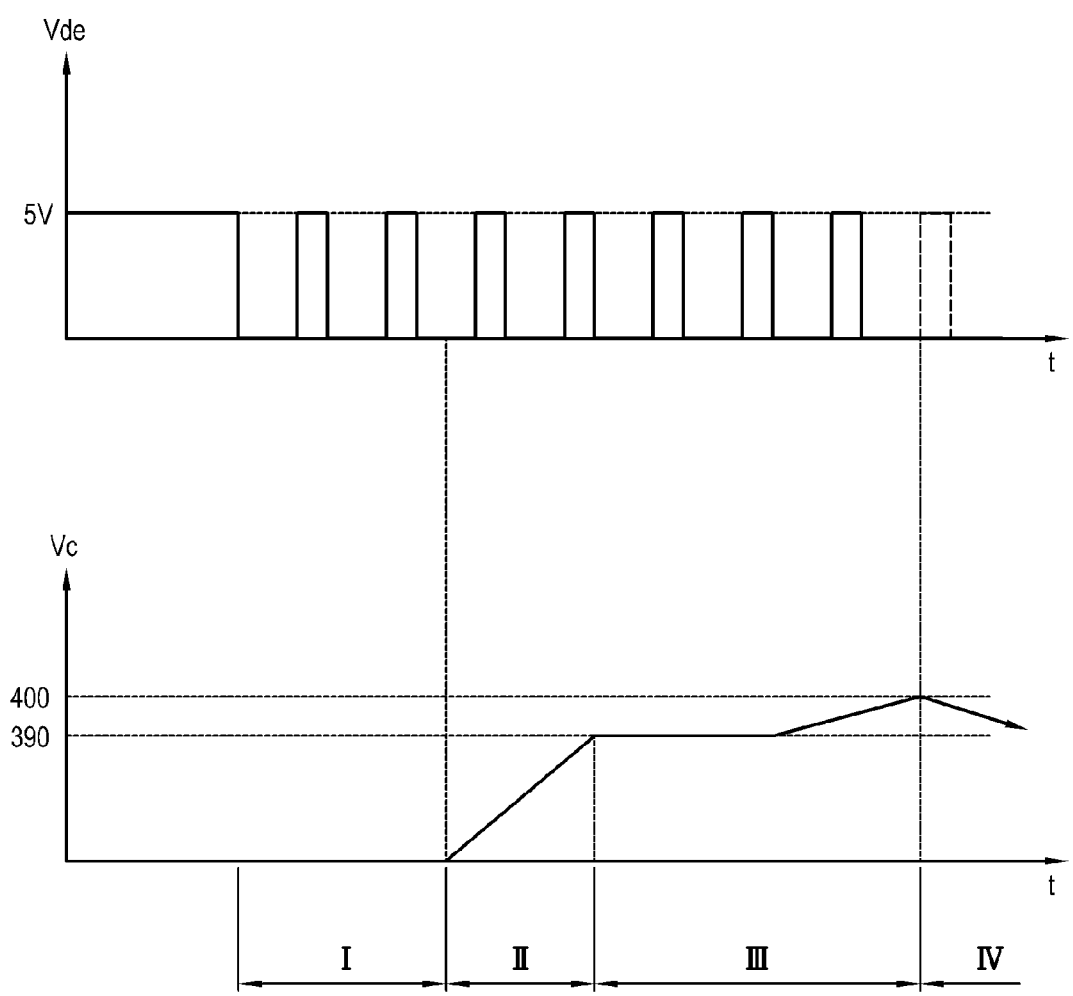
FIG. 4 is a view for explaining an operation of the detector of the power supply that detects whether a power factor correction (PFC) unit is abnormal or normal according to an exemplary embodiment.

FIG. 4 is a view for explaining an operation of the detector of the power supply that detects whether a power factor correction (PFC) unit is abnormal or normal according to an exemplary embodiment.

If the detection signal input from the detector 140 to the microcomputer 130 for a predetermined time is a pulse signal (I), the microcomputer 130 determines the rated AC voltage is input and supplies the on signal to the PFC IC 285, thereby operating the PFC unit 110. As the PFC unit 110 operates, energy is stored in the smoothing capacitor 255 (II). When the smoothing capacitor 255 is fully charged, the voltage Vc is maintained between 390V and 400V.

Meanwhile, the feedback voltage (V2) 270 is used as the input voltage of the second shunt regulator 277, and the third capacitor 302 maintains the level of the voltage (V2) 270. The threshold voltage of the second shunt regulator 277 is previously set up by taking the level of the voltage (V2) 270 into account when the voltage Vc is about 400V. If the voltage Vc is not higher than 400V, the voltage (V2) 270 is lower than the threshold voltage of the second shunt regulator 275 so that the second shunt regulator 275 is turned off. Thus, a pulse signal which alternates between a high state and a low state by a photo-coupler 281 being turned on/off according to the AC voltage is input to the input terminal (A/D port) of the microcomputer 130.

On the other hand, if the voltage Vc is higher than 400V (IV), the voltage (V2) 270 is higher than the threshold voltage of the second shunt regulator 275 so that the second shunt regulator 275 is turned on. If the second shunt regulator 275 is turned on, the light emitter 275 allows an electric current to flow and emits light, and the light receiver 279 receives light and is turned on. When the light receiver 279 is turned on, the voltage Vde, 250 is connected to the ground so that a low signal is supplied to the microcomputer 130.

If a low signal is continuously supplied to the microcomputer 130, the microcomputer 130 determines that the smoothing capacitor 255 is charged with an overvoltage, and supplies the off signal to the PFC IC 285, so that the PFC unit 110 cannot operate. As the PFC unit 110 does not operate, the smoothing capacitor 255 is discharged to make the voltage Vc be equal to or lower than 400V.

If the voltage Vc is dropped and thus the level of the voltage (V2) 270 is lower than that of the threshold voltage of the second shunt regulator 275, the second shunt regulator 275 becomes turned off. When the second shunt regulator 275 is turned off, the voltage (Vde) 250 alternates between the high state and the low state, so that a pulse signal can be supplied to the microcomputer 130. If the pulse signal is supplied to the microcomputer 130 for a predetermined time, the microcomputer 130 supplies the high signal to the PFC IC 285 so that the PFC unit 110 can operate again. As the PFC unit 110 operates, energy is stored again in the smoothing capacitor 255, and the foregoing operations are repeated if the voltage Vc is higher than 400V.

Figure 5:
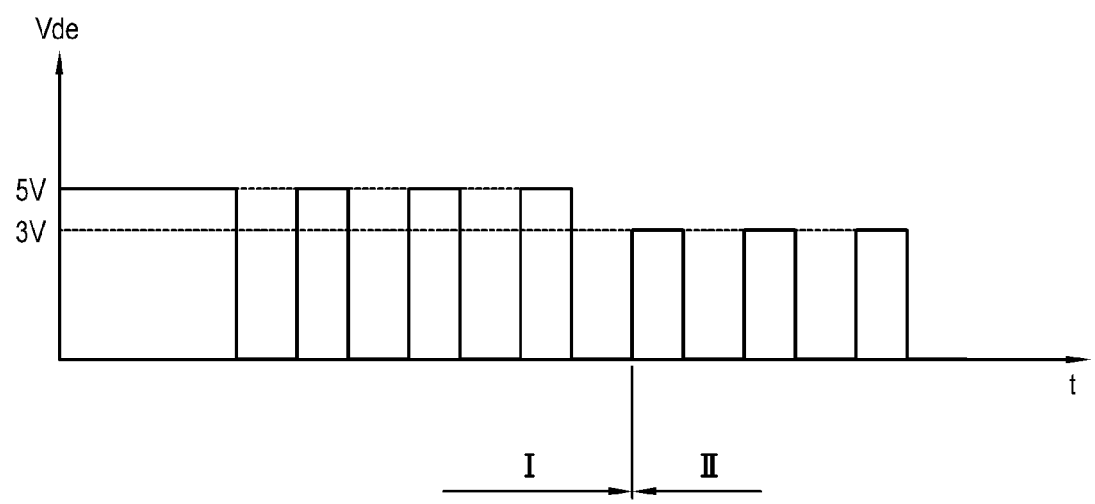
FIG. 5 is a view for explaining an operation of the detector of the power supply that detects whether a voltage converter is abnormal or normal according to an exemplary embodiment.

FIG. 5 is a view for explaining an operation of the detector 140 of the power supply 18 that detects whether the voltage converter 145 is abnormal or normal according to an exemplary embodiment.

When an AC voltage is input, a voltage of about 5V is supplied to the microcomputer 130 or the like even before a user turns on the display apparatus 10. This voltage is used as the standby voltage. If a user powers on through a remote controller or the like, the microcomputer 130 directly controls the elements of the power supply 18 in this exemplary embodiment to operate. If the output voltage of the voltage converter 145, i.e., the operation voltage Vo is 5V, the detection signal supplied to the microcomputer 130 becomes 5V at the high state but 0V at the low state. Thus, when receiving a pulse signal having a voltage level alternating between 5V and 0V (I), the microcomputer 130 may determine that a normal signal is input.

In the meantime, if there is trouble with the voltage converter 145, the level of the voltage (Vo) 120 may be not 5V but 3V. Here, 3V is set as the threshold voltage by way of example. Alternatively, the threshold voltage may be set up as any other levels lower than 5V. The signal supplied to the microcomputer 130 is a pulse signal alternating between the high state and the low state, but the level of the signal at the high state is dropped when there is trouble with the voltage converter 145. Thus, when determining that the level of the signal at the high state is below that of the normal signal, the microcomputer 130 supplies the off signal to the PFC IC 285 so that the PFC unit 110 cannot operate.

If the detector 140 operates as described above, it is possible to output one common detection signal by detecting whether the input AC voltage is a rated voltage, whether the smoothing capacitor 255 of the PFC circuit is charged with an overvoltage, and whether the operation voltage output from the voltage converter 145 is abnormal or normal. Also, the microcomputer 130 receives a common detection signal through the common input terminal, and supplies the off signal to the PFC IC 285 if there is a problem with any one of these voltages, so that the PFC unit 110 cannot operate.

Figure 6:
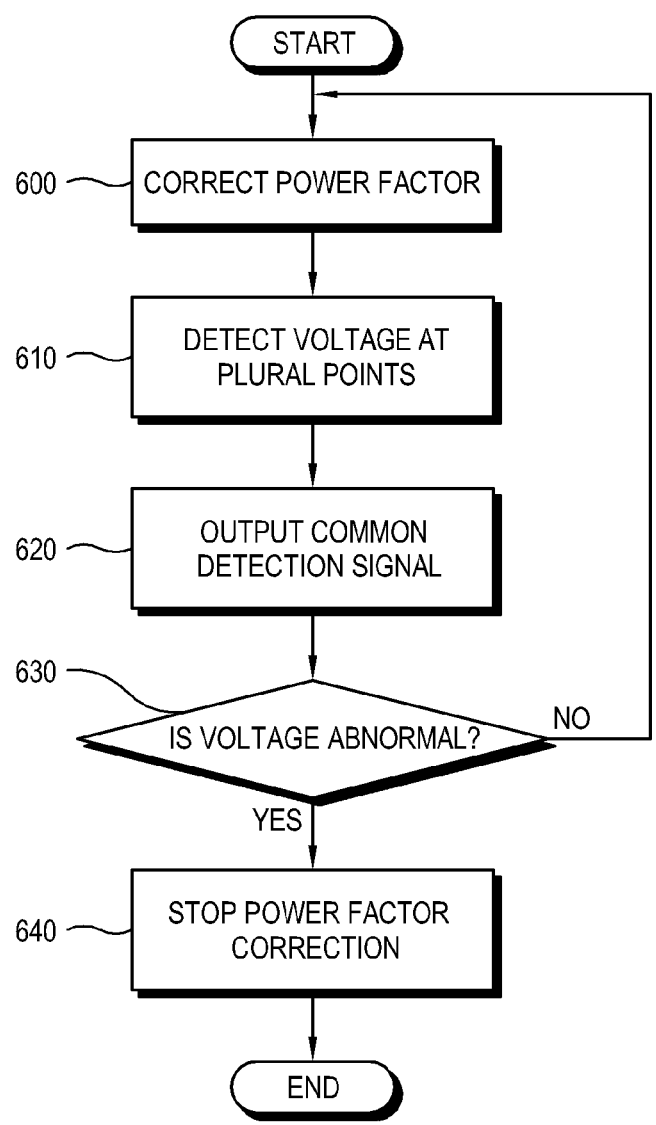
FIG. 6 is a flowchart showing an operated process of the power supply according to an exemplary embodiment.

FIG. 6 is a flowchart showing process for operating the power supply 18 according to an exemplary embodiment. When an AC voltage is input, the rectifying unit 100 converts the AC voltage into a DC voltage, and the voltage converter 145 converts the level of the DC voltage so as to supply the operation voltage Vo 120.

If the AC voltage is a rated voltage, the PFC unit 110 corrects the power factor of the power supply 18 at operation 600. The detector 140 detects the AC voltage, the output voltage Vc of the PFC unit 110 and the operation voltage (Vo) 120 output from the voltage converter 145 at operation 610 and outputs the common detection signal at operation 620. The microcomputer 130 receives the common detection signal through the common input terminal and controls the operation of the PFC unit 110. If the detector 140 outputs the common detection signal indicating that at least one of the AC voltage, the output voltage Vc of the PFC unit 110 and the operation voltage (Vo) 120 output from the voltage converter 145 is abnormal (refer to "YES" at operation 630), the microcomputer 130 stops operating the PFC unit 110 at operation 640. If the detected voltage is not abnormal (refer to "NO" at the operation 630), the microcomputer 130 controls the PFC unit 110 to perform power factor correction at operation 600.

As described above, there is provided a common detection signal about abnormality of elements constituting a power supply, so that the number of elements for detecting abnormality of output voltage can be decreased.

Also, a microcomputer can receive a detection signal output from a detector through a common input terminal, thereby reducing the cost of the power supply.

Although a few exemplary embodiments have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
    a signal receiver which receives a video signal;
    a signal processor which processes the video signal received by the signal receiver;
    a display unit which displays an image based on the video signal processed by the signal processor; and
    a power supply which converts an alternating current (AC) voltage into a first direct current (DC) voltage and supplies an operation voltage to the display unit,
    the power supply comprising:
    a power factor correction (PFC) unit which adjusts the first DC voltage to generate a second DC voltage and corrects a power factor of the power supply;
    a detector which detects a plurality of voltages in the power supply and outputs a common detection signal indicating whether at least one voltage of the plurality of voltages detected is abnormal; and
    a controller which comprises a common input terminal that receives the common detection signal output from the detector, and controls the PFC unit based on the common detection signal.

2. The display apparatus according to claim 1, wherein the PFC unit comprises a feedback unit that outputs a third DC voltage based on the second DC voltage, and feeds the third DC voltage back to the PFC unit, and
    the detector outputs the common detection signal indicating an abnormality if the third DC voltage output from the feedback unit is higher than a first threshold level.

3. The display apparatus according to claim 1, wherein the power supply further comprises a voltage converter which converts a level of the second DC voltage and outputs the operation voltage, and
    the detector outputs the common detection signal indicating an abnormality if the operation voltage output from the voltage converter is lower than a second threshold level.

4. The display apparatus according to claim 3, wherein the operation voltage comprises a standby voltage output when the display apparatus is in a standby mode for power saving.

5. The display apparatus according to claim 1, wherein the power supply further comprises a rectifying unit that rectifies the AC voltage, and
    the detector outputs the common detection signal indicating an abnormality if the AC voltage input to the rectifying unit does not have a preset reference waveform.

6. The display apparatus according to claim 1, further comprising a semiconductor device that controls a voltage level of the common detection signal to indicate an abnormality corresponding to variations in the at least one voltage of the plurality of voltages detected by the detector.

7. The display apparatus according to claim 2, further comprising a semiconductor device that controls a voltage level of the common detection signal to indicate an abnormality corresponding to variations in the third DC voltage output from the feedback unit.

8. The display apparatus according to claim 3, further comprising a semiconductor device that controls a voltage level of the common detection signal to indicate an abnormality corresponding to variations in the operation voltage output from the voltage converter.

9. The display apparatus according to claim 4, further comprising a semiconductor device that controls a voltage level of the common detection signal to turn off the PFC unit when the display apparatus is in a standby mode.

10. The display apparatus according to claim 5, further comprising a semiconductor device that controls a voltage level of the common detection signal to indicate an abnormality corresponding to variations in the AC voltage input to the rectifying unit.

11. The display apparatus according to claim 1, wherein the plurality of voltages are detected at a plurality of points in the power supply.

12. The display apparatus according to claim 11, wherein the plurality of voltages includes at least one of the AC voltage, the second DC voltage, and the operation voltage.

13. A power supplying method of a display apparatus provided with a power supply for supplying an operation voltage by converting a level of a first direct current (DC) voltage obtained from an alternating current (AC) voltage, the power supplying method comprising:
    performing, by the power supply, power factor correction (PFC) by adjusting the first DC voltage to generate a second DC voltage;
    detecting, by the power supply, a plurality of voltages in the power supply;
    outputting a common detection signal indicating whether at least one voltage of the plurality of voltages detected is abnormal; and
    controlling the PFC based on the common detection signal,
    wherein the outputting the common detection signal comprises outputting the common detection signal indicating an abnormality if the operation voltage is lower than a second threshold voltage.

14. The power supplying method according to claim 13, wherein the outputting the common detection signal comprises outputting the common detection signal indicating an abnormality if a third DC voltage based on the second DC voltage and fed back to perform PFC is higher than a first threshold voltage.

15. The power supplying method according to claim 13, wherein the operation voltage comprises a standby voltage output when the display apparatus is in a standby mode for power saving.

16. The power supplying method according to claim 13, wherein the outputting the common detection signal comprises outputting the common detection signal indicating an abnormality if the AC voltage does not have a preset reference waveform.

17. The power supplying method according to claim 13, wherein the plurality of voltages are detected at a plurality of points in the power supply.

18. The power supplying method according to claim 17, wherein the plurality of voltages includes at least one of the AC voltage, the second DC voltage, and the operation voltage.

19. A power supply apparatus comprising:
- a power factor correction (PFC) unit which adjusts a first DC voltage to generate a second DC voltage and corrects a power factor of the power supply apparatus;
- a detector which detects a plurality of voltages in the power supply apparatus and outputs a common detection signal indicating whether at least one voltage of the plurality of voltages detected is abnormal; and
- a controller which comprises a common input terminal that receives the common detection signal output from the detector, and controls the PFC unit based on the common detection signal.

* * * * *